United States Patent [19]
Spooner

[11] Patent Number: 5,820,097
[45] Date of Patent: Oct. 13, 1998

[54] BREAKAWAY ACCESSORY MOUNTING ASSEMBLY FOR VEHICLES AND WINDSHIELD MOUNTED BUTTON THEREFOR

[75] Inventor: Ralph A. Spooner, Holland, Mich.

[73] Assignee: Donnelly Corporation, Holland, Mich.

[21] Appl. No.: 781,408

[22] Filed: Jan. 10, 1997

[51] Int. Cl.⁶ .................................................. F16M 13/00
[52] U.S. Cl. ...................... 248/549; 248/475.1; 248/900; 359/871
[58] Field of Search .................................. 248/548, 549, 248/475.1, 221.11, 222.11, 224.51, 224.61, 900; 359/871, 872

[56] References Cited

U.S. PATENT DOCUMENTS

| | | |
|---|---|---|
| 3,131,251 | 4/1964 | Ryan . |
| 3,367,616 | 2/1968 | Bausch et al. .......................... 248/483 |
| 3,928,894 | 12/1975 | Bury et al. . |
| 4,113,217 | 9/1978 | O'Connell .......................... 248/222.11 |
| 4,254,931 | 3/1981 | Aikens et al. ........................... 248/549 |
| 4,632,348 | 12/1986 | Keesling et al. . |
| 4,936,533 | 6/1990 | Adams et al. . |
| 4,948,085 | 8/1990 | Mittelhauser ............................ 248/549 |
| 5,058,851 | 10/1991 | Lawlor et al. ........................... 248/549 |
| 5,100,095 | 3/1992 | Haan et al. .............................. 248/549 |
| 5,330,149 | 7/1994 | Haan et al. .............................. 248/549 |
| 5,356,105 | 10/1994 | Andrews ......................... 248/224.61 X |
| 5,377,948 | 1/1995 | Suman et al. ........................... 248/549 |
| 5,377,949 | 1/1995 | Haan et al. ................................ 248/53 |
| 5,439,305 | 8/1995 | Santo ................................. 248/549 X |

FOREIGN PATENT DOCUMENTS

| | | |
|---|---|---|
| 2210958 | 7/1974 | France . |
| 2354219 | 6/1976 | France . |
| 2414075 | 11/1974 | Germany . |
| 2046687 | 11/1980 | United Kingdom . |
| 2048803 | 12/1980 | United Kingdom . |

*Primary Examiner*—Leslie A. Braun
*Assistant Examiner*—Derek J. Berger
*Attorney, Agent, or Firm*—Van Dyke, Gardner, Linn & Burkhart, LLP

[57] ABSTRACT

A breakaway mounting assembly supports a rearview mirror or other accessory on an improved windshield mounted button. The mounting assembly includes a base having a mount for the accessory or mirror, and a plurality of resilient flanges which engage, hold, and center the assembly on the button but flex to release the assembly if impacted from virtually any direction. Preferably, the resilient flanges are formed in one piece with a retainer mounted on the base by a plurality of mounting flanges also formed in one piece with the retainer and engaging a shoulder on the base. An open release space is defined between a pair of the flanges, while the base has an unobstructed open area aligned with the release space through which the button may be released when the mirror or accessory is impacted directly from the mirror reflecting surface. An inclined wall surface on the base cams the assembly off the button when the mirror or accessory is impacted from the side. The button is tapered toward a curved top end and the windshield attachment surface and has a recess at its bottom end adapted to receive one of the resilient flanges.

51 Claims, 7 Drawing Sheets

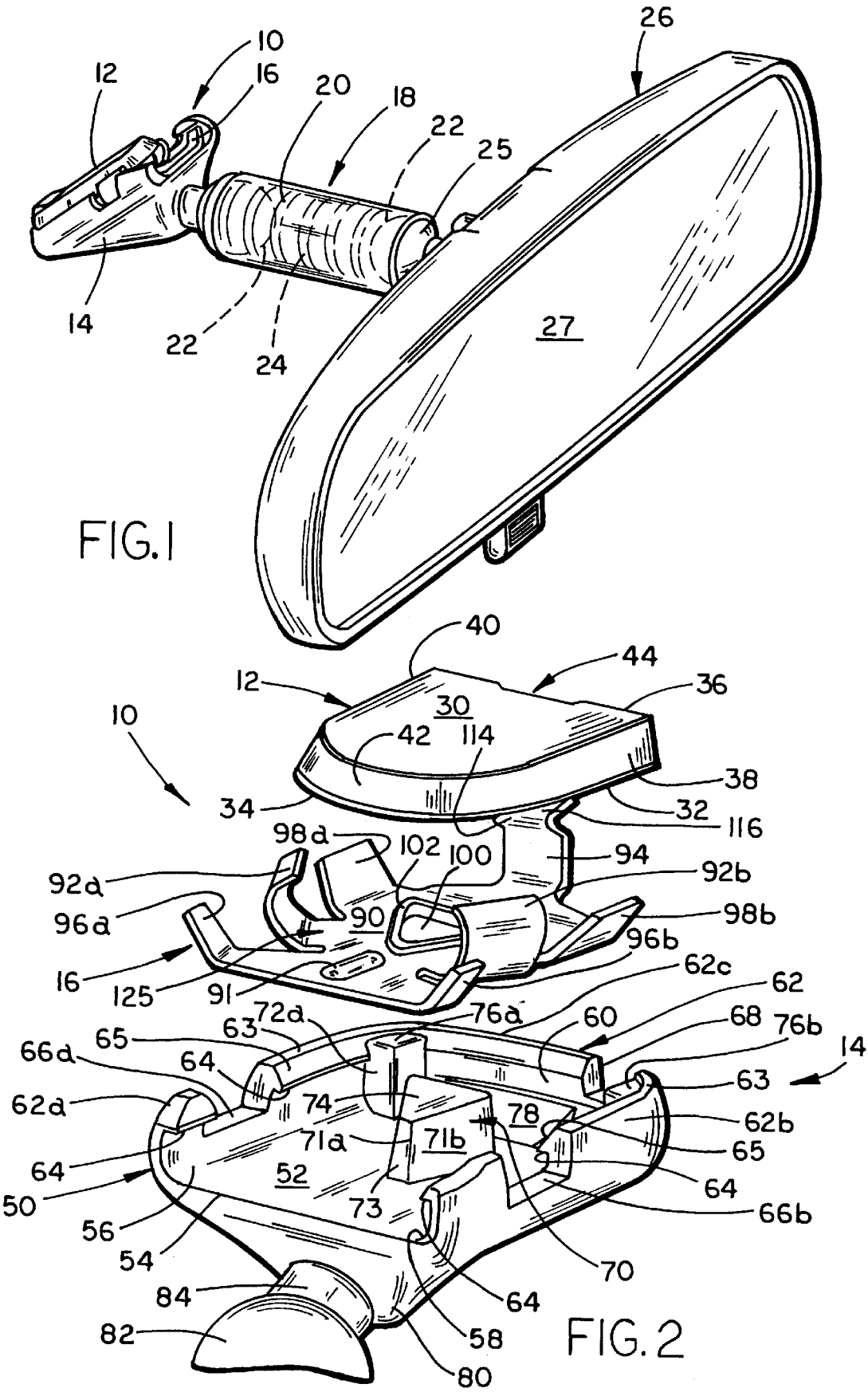

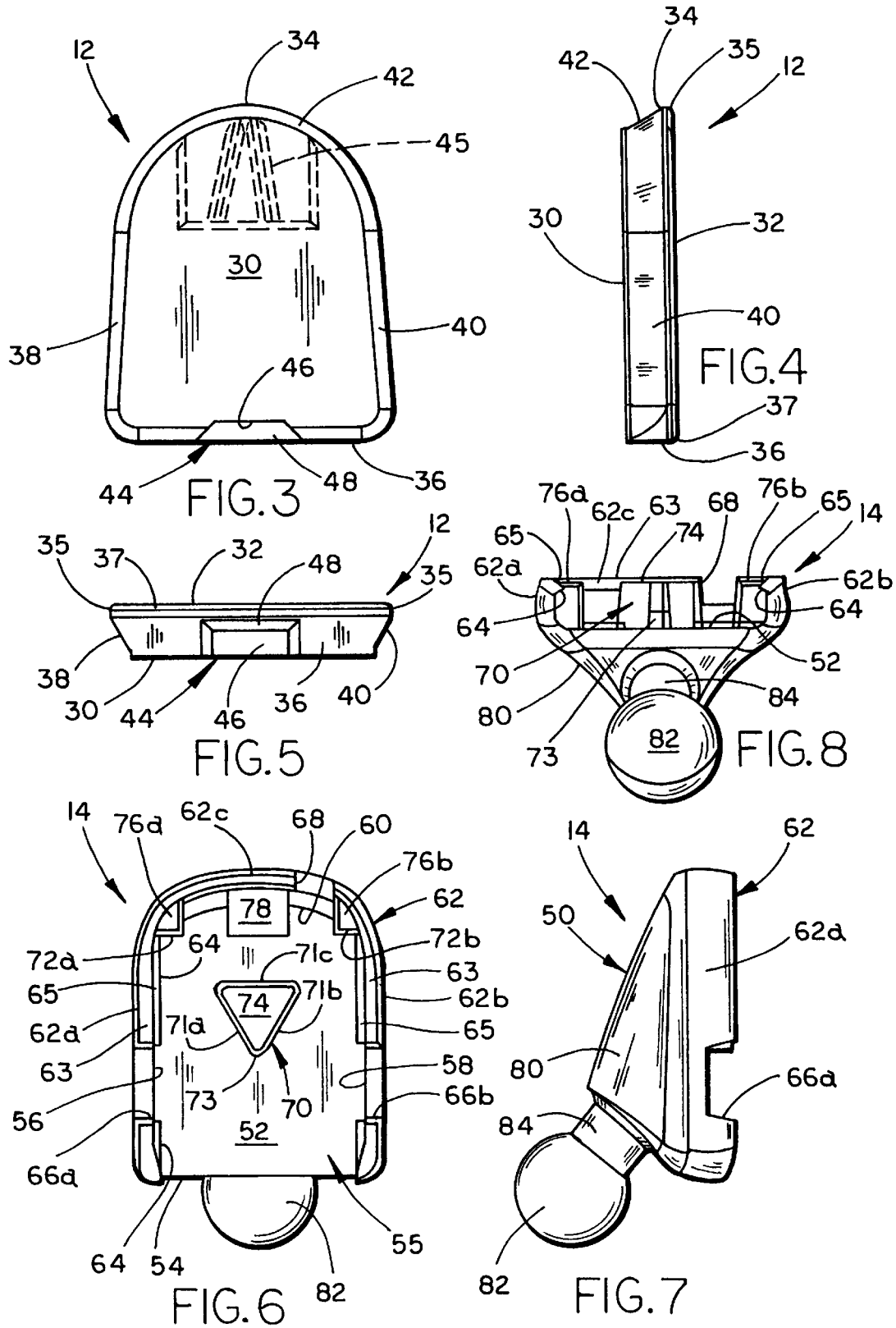

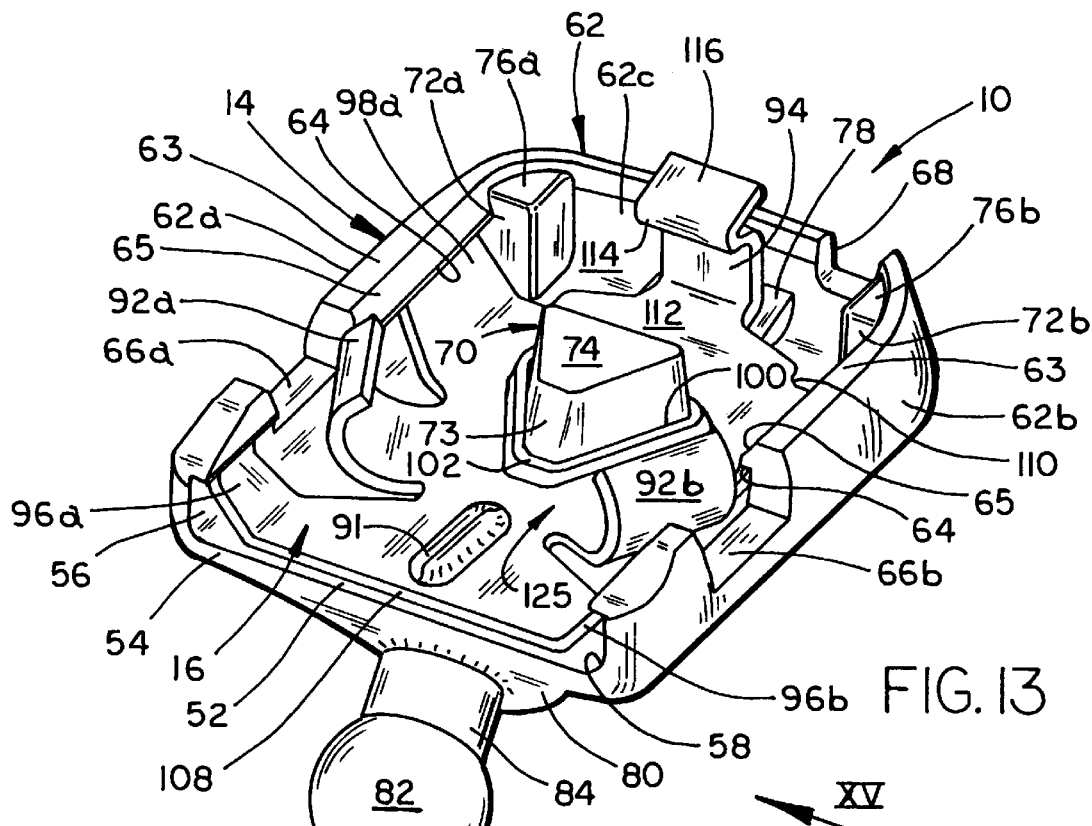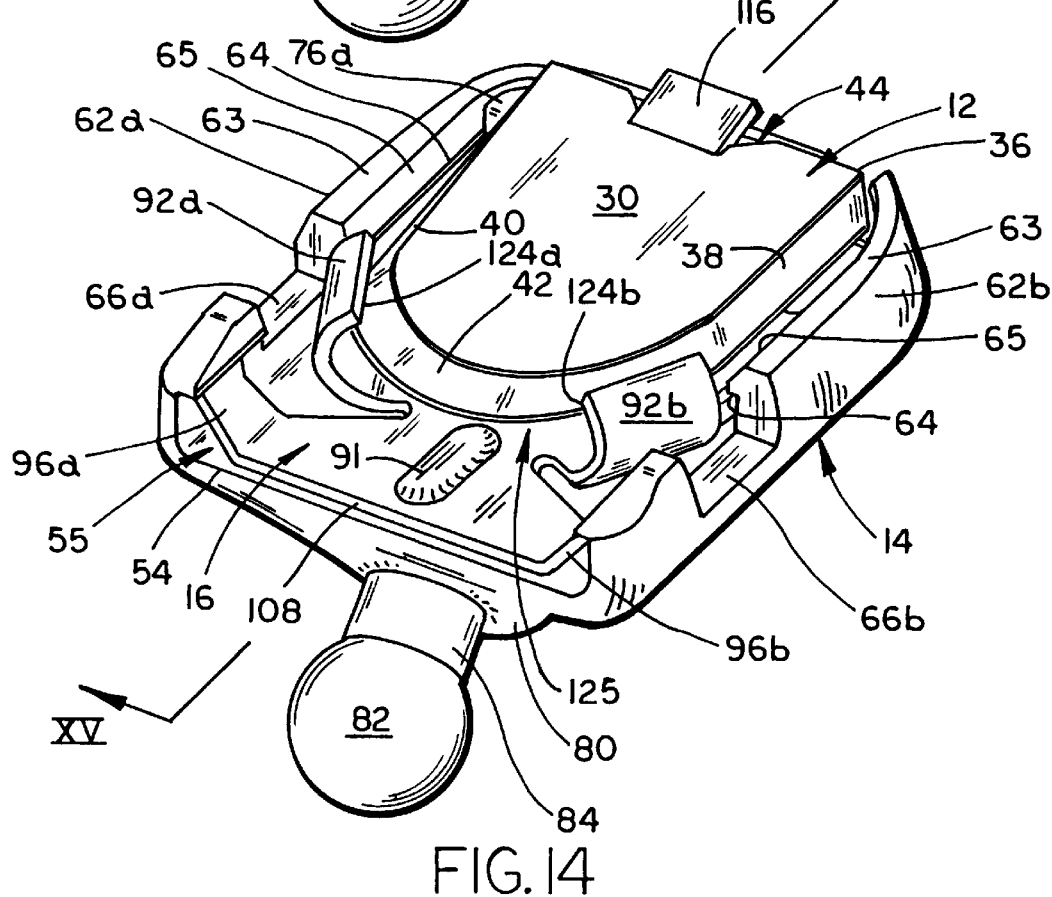

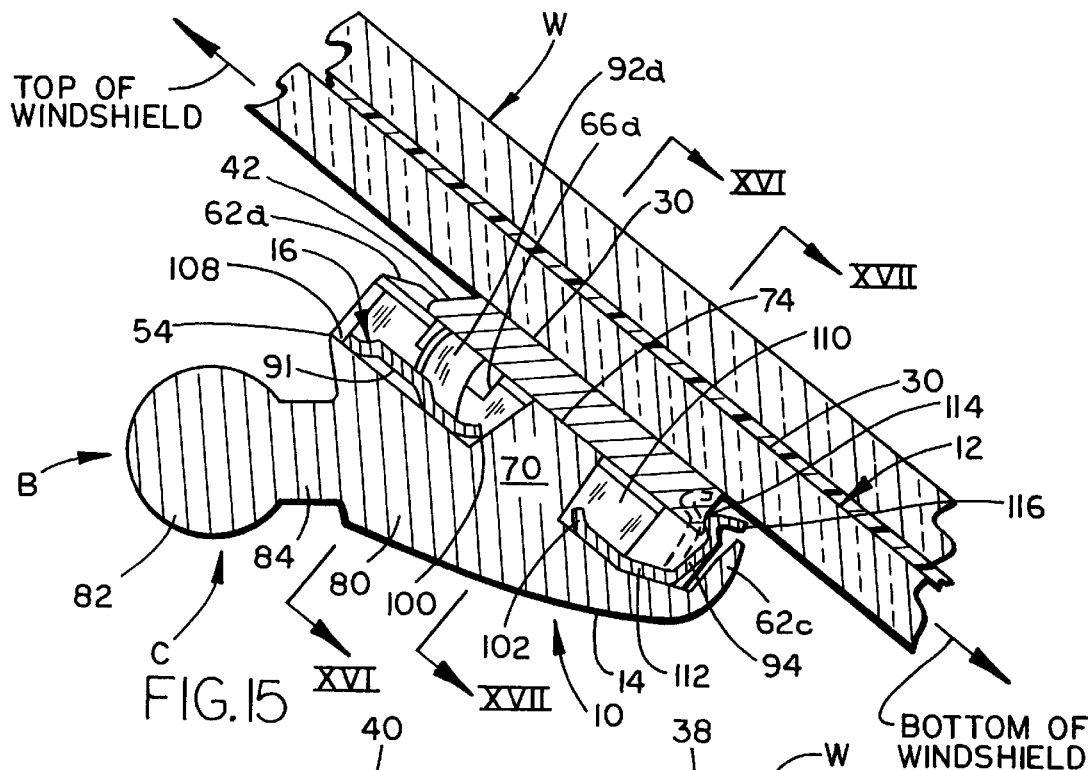
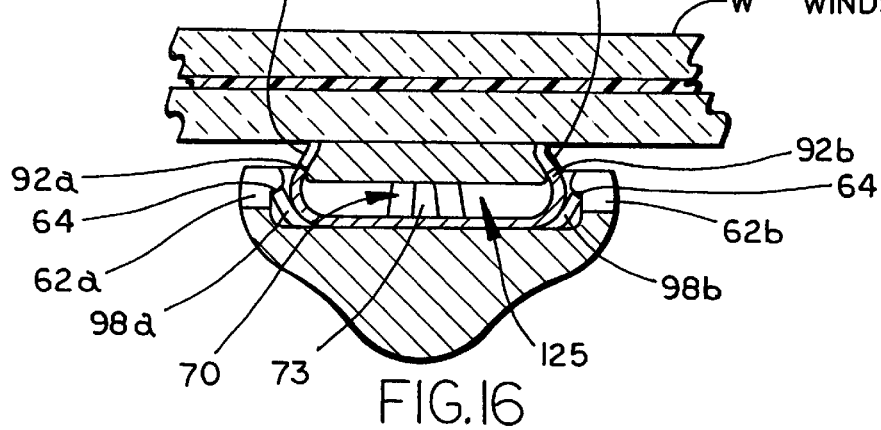
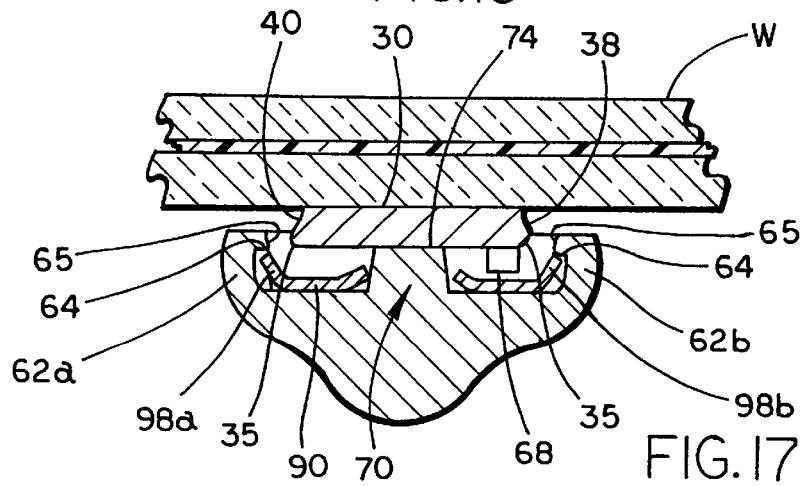

BREAKAWAY ACCESSORY MOUNTING ASSEMBLY FOR VEHICLES AND WINDSHIELD MOUNTED BUTTON THEREFOR

BACKGROUND OF THE INVENTION

This invention relates to support assemblies for mounting accessories such as rearview mirrors in vehicles, and more particularly, to a vehicular accessory mounting assembly and a windshield mounted button therefor adapted for attachment to the inside surface of a vehicle windshield. The assembly separates from the button on the windshield if impacted such as by an occupant of the vehicle in an accident, or by the expansion of a supplemental restraint system or airbag in the vehicle, or by other objects.

Rearview mirrors and other vehicle interior accessories used by the driver or other vehicle occupants are commonly secured directly to the inside surface of the windshield in the forward vision area of the driver. During accidents or sudden stops, if the driver or front seat occupants are thrown forwardly, serious injury could result from striking the rearview mirror or other accessory or its support system. Thus, many different supports have been used in the past to allow the rearview mirror or accessory to release and separate from its mounting upon impact.

More recently, supplemental restraint systems, commonly known as airbags, have been incorporated into the instrument panel area or steering wheel hub of many vehicles. Such systems include bags which are rapidly inflated with pressurized air or gas in a fraction of a second to provide a cushion preventing serious injury to the front seat occupants. However, the use of airbags has created problems with windshield mounted interior rearview mirrors and other accessories. For example, during inflation, an airbag can strike the rearview mirror when mounted adjacent the interior windshield surface and either tear the bag and destroy its effectiveness or actually break the rearview mirror from its mount due to the force of the inflation, thereby leaving sharp objects protruding from the broken assembly which themselves can injure passengers.

Alternately, once inflated, a pair of airbags in the front of the vehicle can engage one another in the center of the vehicle causing a front seat occupant to be funneled toward the boundary therebetween and directly into the rearview mirror. Further, inflated airbags can sometimes trap the mirror and prevent the mirror from properly releasing to prevent injuries. Some prior known accessory/rearview mirror mounts have inadequately functioned with inflatable restraint systems and/or may pose potential hazards within the vehicle passenger compartment.

In addition to the above problems, prior known breakaway, windshield mounted rearview mirror or other accessory mounting systems have typically been designed to accommodate only the governmental regulations and customer requirements of a single country or region. For example, United States Federal Motor Vehicle Safety Standard 111, European Economic Community (EEC) Regulation 72-245/EEC, Japanese Safety Standard Article 44 and airbag interaction requirements from major United States vehicle manufacturers all present differing requirements. Conventional breakaway mounting systems have typically failed to accommodate all such regulations and requirements thereby requiring different systems and increased costs for the mounting of rearview mirrors or other accessories in vehicles intended for use in different countries.

Similarly, different support systems for interior rearview mirrors or accessories have been widely used on different vehicles such as a rigid arm terminating in a single ball adjustment system or a double ball adjustment system. Currently, most single ball adjustment systems, but only some of the two ball systems, are designed for breakaway upon impact. No previous rearview mirror or accessory mounting system has been commercially available to meet all the regulations and requirements of all countries and manufacturers with both one or two ball adjustment systems.

A further problem encountered with conventional mounting systems is the lack of stable support causing vibration problems and consequent poor vision quality in the rearview mirror when mounted with such systems. Moreover, prior known systems have been subject to only partial installation by the assembly line worker or other installer. For example, in some systems, the mounting attachment can be slid into a partially attached position but inadvertently not finally locked in place leaving the supported mirror loose and susceptible to severe vibration or even allowing the accessory or mirror to drop off the windshield mount early in the life of the vehicle. Also, some prior known systems have relied on an audible click to indicate to the installer proper mounting onto the windshield mount. Such audible clicks may be difficult to hear on an vehicle assembly line, may be confused with other noises, or may be inaudible to the hearing impaired such as the deaf.

Another problem is the inability of many prior known systems to allow breakaway or release when impacted from virtually any direction. As can be appreciated, impact during a collision or sudden stop or deployment of an airbag can occur from either the front or rear of the supported mirror, from either side, or at various angles in between. Mounting systems which fail to release from all directions thereby continue the potential hazards and problems noted above and are inadequate to meet the necessary worldwide vehicle regulations and customer requirements.

The present mounting assembly provides an economical, easily manufactured, highly reliable system which overcomes these and related rearview mirror or other accessory mounting problems in vehicles.

SUMMARY OF THE INVENTION

Accordingly, the present invention provides a breakaway accessory mounting assembly for vehicles which meets worldwide governmental regulations and vehicle manufacturer requirements and, as such, is a universal mount, accommodates both one ball and two ball adjustment mounting systems, provides release upon impact against the supported mirror or accessory or support system from virtually all directions, reduces occupant injuries if impacted, avoids damage or hindrance to the operation of supplemental restraint systems or airbags in vehicles, provides tactile feedback of proper installation on the windshield mounting button, provides stable support reducing vibration in the supported mirror or accessory, and prevents partial engagement problems causing poor quality visibility in or loss of the supported mirror, all while providing a more easily manufactured and economical assembly.

In one form, the invention is a windshield supported, mounting assembly for vehicle accessories such as rearview mirrors adapted for breakaway release when the rearview mirror or accessory is impacted in a collision by a vehicle occupant and/or by a deploying airbag, the assembly comprising a base having a body for connecting the assembly to a windshield mounted button, a button support on the body, and an accessory/support mount providing a connection for the base to at least one of an accessory such as a rearview mirror and a support for an accessory such as a rearview mirror. The base has a plurality of resilient retaining flanges formed from resilient material and located at positions spaced from one another around the button support for engaging the windshield mounted button to generally center the button therebetween and releasably hold the button therebetween and against the button support yet resiliently flex to release the button when the rearview mirror or accessory is impacted. A pair of the resilient flanges define an open release space therebetween allowing release of the button therebetween when the pair of resilient flanges are flexed by an impact force which acts on the assembly to urge the assembly in a direction such that the button is moved through the open release space. The base includes an unobstructed open area aligned with the release space between the resilient flanges, the assembly providing an open, unobstructed passageway between the open release space and the unobstructed open area allowing release of the button from the assembly through the open area when the button is caused to move between the pair of resilient flanges.

In a preferred form of the invention, the retaining flanges are spaced in a triangular configuration around the button support, and include a pair of resilient retaining flanges spaced from one another and the button support on opposite sides of the button support and having button engaging surfaces extending at an acute angle to one another and adapted to engage generally opposed portions of the button. A third, resilient end flange is spaced from the pair of retaining flanges and the button support surface and is adapted to engage a recess in an end surface of the button in opposition to the generally opposed button portions engaged by the retaining flanges.

In other preferred aspects of the invention, the body of the base includes a retainer receiving portion which receives and mounts a retainer for connecting the assembly to the button. A one-piece retainer is formed from resilient material and includes the retainer receiving portion and the plurality of resilient retaining flanges. The retainer receiving portion may include a retainer recess in the body and an upstanding wall extending partially therearound and ending at the open area. The wall preferably includes an inclined surface which is adapted to engage the edge of the windshield button to help release the assembly from the button when the mirror or accessory is impacted from the side. The wall also has a shoulder while the retainer preferably also includes a plurality of upstanding, resilient mounting flanges, each mounting flange having a terminal end. The terminal ends of those mounting flanges engage the shoulder on the wall to secure the retainer in the retainer recess. In addition, the retainer mounting portion preferably includes an aperture receiving the button support with an interference fit to help secure the retainer on the retainer receiving portion and to properly orient the retainer when assembled to the base.

Further, the body may include second and third button supports spaced from the first mentioned button support and positioned adjacent the end flange for providing a three point support on the mounting surface of the button when the assembly is mounted on the button.

Preferably, the pair of resilient flanges and end flange exert forces on the button generally parallel to the plane of the windshield surface when the assembly is mounted on the vehicle, the windshield surface being generally parallel to the button support surfaces on the base member. The forces exerted by the flanges act to both center the button within the flanges for stable support and hold the entire assembly to the button until an impact force causing release is experienced.

In another aspect, the invention includes a mount or button for attachment to a surface of a windshield to support a mounting assembly and an accessory such as a rearview mirror. The button includes an attachment surface for attachment to a windshield surface, a mounting surface for engaging an accessory mounting assembly, and a peripheral edge extending between the attachment and mounting surfaces. The peripheral edge defines a top end, bottom end and opposing sides. The sides converge toward one another in the direction of said top end and taper inwardly toward one another from the mounting surface to the attachment surface. The peripheral edge at the top end is curved and inclined inwardly from the mounting surface to the attaching surface, while the bottom end includes a bottom recess spaced toward said attachment surface from the mounting surface and has an inner surface and a recess shoulder extending between the inner surface and the bottom end.

The present breakaway accessory mounting assembly and windshield mounted button provide numerous advantages over prior known assemblies and buttons. First, the mounting assembly is designed to meet current governmental regulations and vehicle manufacturer requirements on a worldwide basis and can be used with both single ball and double ball adjustment systems such that the assembly is a universal system. The assembly provides for breakaway release of the supported mirror or accessory and any support system due to impact from virtually any direction by a vehicle occupant, a deployed airbag within the vehicle passenger compartment, or other objects which may strike the mirror. The assembly provides a stable support reducing vibration and providing a proper platform for mirror adjustment during use while simultaneously eliminating partial engagement problems previously experienced upon installation of prior known systems which can cause both significant vibration and consequent poor quality vision in the supported mirror. The assembly may be easily installed without the requirement of tools, provides positive tactile feedback indicating complete attachment, and yet is easy to remove for repair or replacement of the windshield. In addition, the assembly has a reduced number of parts, is economical, and is more easily assembled without the requirement of separate fasteners or processes than are prior known systems. Further, the windshield mounted button is adapted for support of the accessory mounting assembly of the present invention, yet accepts many prior known mounting assemblies currently in use such that existing accessory supports and mirrors may still be used with the button of this invention.

These and other objects, advantages, purposes and features of the invention will become more apparent from a study of the following description taken in conjunction with the drawings.

BRIEF DESCRIPTION OF THE DRAWINGS

FIG. 1 is a perspective view of a first embodiment of the breakaway accessory mounting assembly of the present invention shown supporting an interior rearview mirror assembly and an associated two ball support arm;

FIG. 2 is a fragmentary, perspective, exploded view of the breakaway accessory mounting assembly shown in FIG. 1 and an improved windshield mounted button for use with the mounting assembly;

FIG. 3 is a plan view taken from the windshield attachment side of a preferred embodiment of the improved windshield mounted button to which the breakaway accessory mounting assembly of the present invention is adapted to be secured;

FIG. 4 is a side elevation of the windshield mounted button of FIG. 3;

FIG. 5 is a bottom end elevation of the windshield mounted button of the present invention;

FIG. 6 is a plan view taken from the retainer attachment side of the base member of the breakaway accessory mounting assembly shown in FIGS. 1 and 2;

FIG. 7 is a side elevation of the base member shown in FIG. 6;

FIG. 8 is an end elevation of the base member shown in FIG. 6;

FIG. 13 is a perspective view of the breakaway accessory mounting assembly shown in FIGS. 1 and 2 including the button receiving retainer of FIGS. 9–12 assembled in the base member of FIGS. 6–8.

FIG. 14 is a perspective view of the breakaway accessory mounting assembly shown in FIGS. 1, 2 and 13 and the windshield mounted button of the present invention wherein the button receiving retainer is assembled in the base member and the windshield mounted button is mounted in the assembly;

FIG. 15 a side sectional view taken along plane XV—XV of FIG. 14 when the windshield mounted button is secured to the inside surface of a windshield;

FIG. 16 is a sectional end elevation of the breakaway accessory mounting assembly secured to the windshield mounted button taken along plane XVI—XVI of FIG. 15;

FIG. 17 is another sectional end elevation of the mounting assembly taken along plane XVII—XVII of FIG. 15;

DESCRIPTION OF THE PREFERRED EMBODIMENTS

Figure 9:
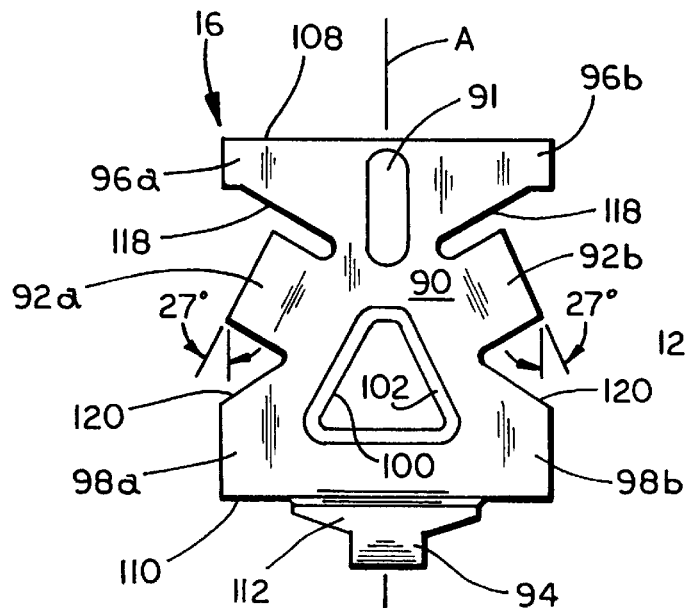
FIG. 9 is a plan view taken from the base attachment side of the resilient, button engaging retainer of the breakaway accessory mounting assembly shown in FIGS. 1 and 2.
Figure 10:
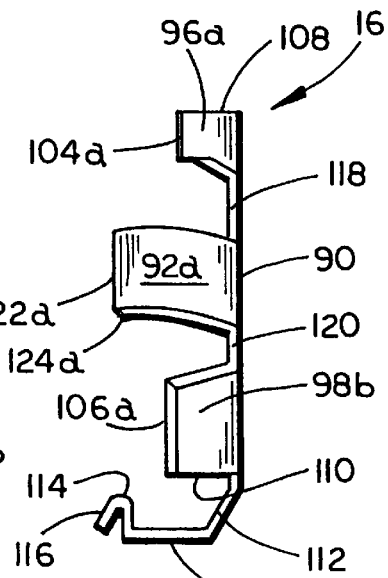
FIG. 10 is a side elevation of the retainer shown in FIG. 9.
Figure 11:
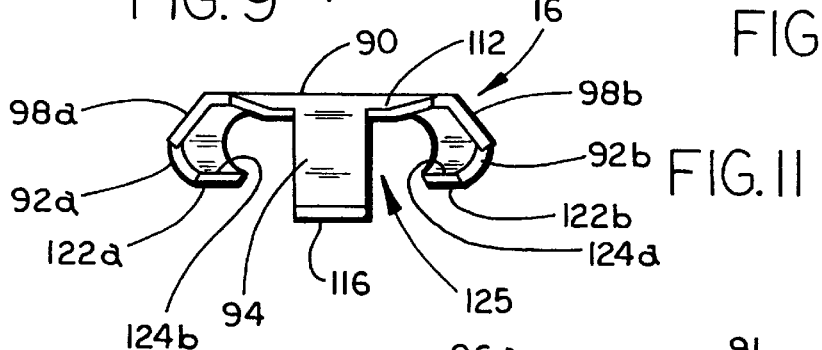
FIG. 11 is an end elevation of the retainer shown in FIGS. 9 and 10.
Figure 12:
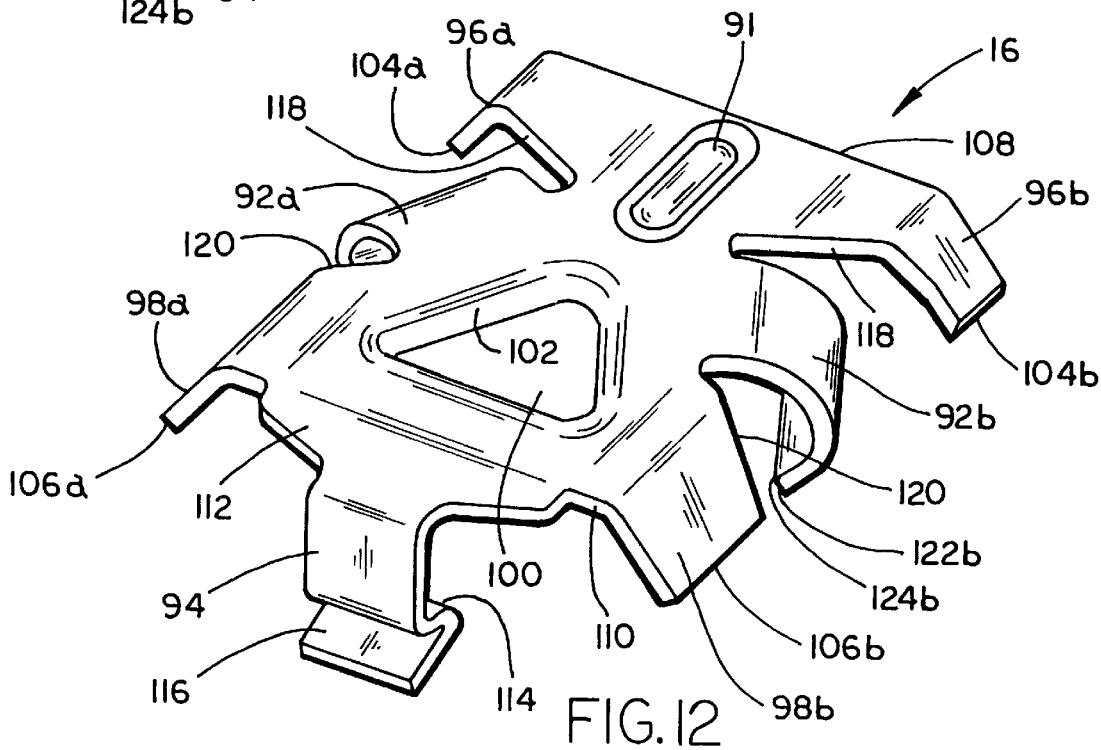
FIG. 12 is a perspective view of the retainer shown in FIGS. 9–11.

Referring now to the drawings in greater detail, FIGS. 1, 2 and 13–20 illustrate a first embodiment 10 of the breakaway accessory mounting assembly of the present invention. Breakaway accessory mounting assembly 10 is shown secured to an improved, double-tapered, wedge-type, windshield mounted button 12 adapted to be secured to the inside surface of a vehicle windshield which is typically formed from laminated safety glass, as shown in FIGS. 15–20. The breakaway accessory mounting assembly 10 includes a base member 14 receiving a one-piece, resilient retainer 16 mounted thereon, the retainer adapted to engage and retain the entire assembly to button 12 when the button is secured to a windshield. As explained below, base 14 includes an outwardly extending ball member 82 adapted to adjustably receive either an interior rearview mirror assembly 26 directly or an adjustable support assembly, such as the two-ball support assembly 18 shown in FIG. 1. Adjustable support assembly 18 is of conventional design and includes a tube 20 having ball cup members 22 received in the ends of the tube and urged outwardly toward the ends by an intermediate coil spring 24, all as more fully described in U.S. Pat. No. 5,377,949, assigned to the same assignee as the present invention, the disclosure of which is hereby incorporated by reference herein. The second ball member 25 received in the outer end of the tube of support assembly 18 projects from interior rearview mirror assembly 26 and forms no part of the present invention. Mirror assembly 26 has a rearwardly facing reflecting surface 27. As described below in connection with FIG. 21, a second embodiment 150 of the breakaway accessory mounting assembly may incorporate a rearview mirror or accessory support arm 152 extending from the base member 14' and supporting a single ball-type adjustment member 154 for attachment directly to an interior rearview mirror assembly (not shown). Both embodiments of the breakaway accessory mounting assemblies 10, 150 incorporate substantially the same base and retainer and are adapted to releasably attach to the same improved windshield mounted button 12. As referenced in the following description, rearview mirror assembly 26 and support arm 18 or adjustment member 154 extend rearwardly into the passenger compartment of the vehicle from the windshield area. Mounting assembly 10, 150 is typically positioned centrally on the windshield above the vehicle instrument panel. The direction to the left and toward the windshield in FIG. 1 is, therefore, the forward direction, while that to the right and toward the passenger compartment is the rearward direction. As will be understood, breakaway accessory mounting assembly 10, 150 could be mounted on other windows or other vehicle panels to support other accessories, such as compasses, interior lights, cellular telephones or microphones, radar detectors, or other vehicle accessories, all of which may require release upon impact during an accident, airbag deployment, or the like.

As is best seen in FIGS. 3–5, the improved windshield mounted button 12 is a preferably generally planar, elongated body formed from sintered stainless steel although other metals, plastics and forming processes could also be used. Button 12 is preferably adhered to the surface of a glass windshield W (FIGS. 15–20) by a layer of conventionally known metal to glass adhesive, such as polyvinyl-buteral available from Monsanto Company of St. Louis, Mo., silicone available from Dow Corning Corporation of Midland, Mich., or modified epoxy tape available from 3M Company of St. Paul, Minn. The button includes a generally planar, forward facing attachment surface 30 adapted to be adhered to the inside surface of the windshield, a generally planar, rearward facing mounting surface 32 for engaging the breakaway accessory mounting assembly 10 on the side of the button opposite attachment surface 30, a curved top end 34 and a generally planar bottom end 36. Bottom end 36 extends generally perpendicular to surfaces 30, 32. Extending between the attachment and mounting surfaces 30, 32 is a peripheral edge including inwardly converging or angled side edges 38, 40 which taper inwardly from the larger mounting surface 32 toward the smaller attachment surface 30, and a curved edge 42 which extends from one side edge 38 to the other side edge 40 and along the curved top end 34. Edge 42 is angled inwardly for its full extent in the same manner as side edges 38, 40 as shown in FIG. 4. In addition, side edges 38, 40 converge toward one another as they extend toward top end 34 thereby providing the button 12 with an overall double tapered shape. The corner between surface 32 and edge surfaces 38, 40, 42 is radiused and rounded as shown at 35 (FIGS. 4, 5 and 17) to meet the requirements for interior vehicle parts which could be exposed and struck in an accident such as in the EEC. Rounded corner 35 also cooperates with inclined surface 65 on wall 62 to allow release of the assembly when mirror 26 is impacted from the side as is more fully explained below. In addition, bottom end 36 includes a notch or recess 44 having a bottom or floor 46 which is generally planar and parallel to end surface 36, and an inwardly angled surface or shoulder 48 extending between end surface 36 and floor 46 parallel to mounting surface 32. Recess 44 is spaced from mounting surface 32 toward attachment surface 30 and opens to attachment surface 30. As explained below, shoulder 48 provides an inclined contact surface for a resilient retaining flange on bracket 16 when assembly 10 is mounted on button 12. Button 12 also includes a corner or edge 37 between mounting surface 32 and bottom end 36 which is radiused or rounded like corner 35 above to meet EEC vehicle regulations and to aid in the flexing of end flange 94 into recess 44 as explained below. Corner 37 enables button 12 to be used with other prior known mounting assemblies in addition to assemblies 10, 150 described herein. As shown in phantom in FIG. 3, button 12 may also include ribs or ridges 45 which enable the button to be used with mounting assemblies such as those in U.S. Pat. Nos. 4,936,533 and 5,100,095. Optionally, attachment surface 30 of button 12 may be secured by sintering or brazing to a stainless steel or zinc plate having an area larger than that of attachment surface 30 to provide an enlarged area for increased adherence to the windshield surface via adhesives such as those mentioned above.

With reference to FIGS. 2, 6–8, 13 and 14, base member 14 is preferably die cast from zinc or another suitable metal or, alternately, can be molded from resinous plastic material. Suitable resinous plastic materials include VERTON™, a long fiber, glass-filled nylon available from LNP Engineering Plastics Inc. of Exton, Pa., GRIVORY GV™, a short glass fiber-filled nylon available from EMS American Grilon Inc., Sumter, S.C., TERLURAN™, an acrylonitrile butadiene styrene (ABS) polymer available from BASF Corporation of Parsippany, New Jersey, or other high modulus, low creep, engineering plastics, such as polybutylene terephthalate (PBT) or polyethylene terephthalate (PET). Base 14 includes a body 50 including a generally planar, rectangularly-shaped, retainer receiving portion or area 52 having a top end 54, opposing side edges 56, 58, a bottom end 60, and an upstanding wall 62. Wall 62 includes a terminal surface 63, side portions 62a, 62b and bottom end portion 62c which extend continuously along and around side edges 56, 58 and bottom end 60 of the bracket receiving area 52 to define a recess or receptacle in which retainer 16 is received and secured. The inside surfaces of side portions 62a, 62b of wall 62 include inwardly extending lips 64 defining an undercut shoulder for securing retainer 16, as well as outwardly inclined surfaces 65 (FIGS. 2, 6, 8, 13, 14 and 17) which engage radiused corners 35 on button 12 when mirror 26 or a supported accessory is impacted from the side causing assembly 10, and thus the supported mirror to be cammed off and released from button 12. In addition, opposed rectangular openings 66a, 66b provide clearance room for flexing of portions of retainer 16 to release from button 12, while a tool receiving opening 68 is formed in bottom end wall 62c for receipt of a small screwdriver or other tool to allow removal of the assembly from button 12 when desired. Also formed within the recess or receptacle of the retainer receiving portion 52 are a series of button supports 70, 72a, and 72b. Button support 70 is a freestanding, triangularly-shaped post having sides 71a, 71b, 71c (FIG. 6) and a generally planar top surface 74 which is spaced slightly below the terminal edge of wall 62 (FIGS. 15–17 and 20). Button supports 72a, 72b include generally planar top surfaces 76a, 76b which are generally co-planar with surface 74 of button support 70. Button supports 72a, 72b are integrally formed with the interior surface of wall 62 adjacent the corners between side wall portion 62a, 62b and bottom wall portion 60, respectively. Button supports 70, 72a, and 72b are positioned in a triangular configuration with support 70 being generally equidistant from wall portion 62a, 62b and spaced toward top edge 54 from bottom wall portion 62c. Button supports 72a, 72b are adjacent but spaced from end flange 94 of retainer 16 when the retainer is mounted on base 14. An inclined surface 78 is formed between retainer receiving surface 52 and bottom wall portion 62c (FIGS. 2, 6 and 13) to provide a support for one of the retaining flanges of retainer 16 as explained more fully below.

In addition, body 50 of base member 14 includes a downwardly extending contoured section 80 projecting below retainer receiving surface 52 from which ball member 82 extends at an acute angle to the plane of surface 52 on neck portion 84. As shown in FIGS. 2, 6, 8, 13 and 14, wall portions 62a, 62b end adjacent top edge 54 of retainer receiving surface 52 to define an unobstructed open area 55 (FIGS. 6, 14) which is aligned with the apex 73 defined by inwardly converging sides 71a, 71b of triangular button support 70. Like surface 74 of button support 70, surfaces 76a, 76b of button support 72a, 72b are spaced slightly below the terminal edge of wall 62.

As is best seen in FIGS. 2, 9–12, and 13–17, button receiving retainer 16 is a one-piece member preferably stamped from resilient, spring steel and having a thickness preferably within the range of between about 0.030 and 0.040 inches, and preferably about 0.035 inches. Retainer 16 includes a generally planar mounting area 90 from which extend a plurality of outwardly extending, cantilever-type, button retaining and end flanges 92a, 92b, and 94, and a plurality of retainer mounting flanges 96a, 96b and 98a, 98b. A securing aperture 100 is configured in a triangular shape defined by an upturned lip 102 to correspond to the shape and size of button support 70 on base 14 to provide an interference fit when placed thereover. Mounting flanges 96a, 96b and 98a, 98b are outwardly flared and terminate in generally co-planar end surfaces 104a, 104b and 106a, 106b which face outwardly and upwardly and are adapted to nest under the retaining shoulder defined by lip 64 on the interior surface of upstanding wall 62 on base 14 when the retainer is received in the retainer receiving recess of the base against surface 52. Mounting portion 90 includes an elongated, indented rib 91 to provide additional strength resisting flexing of the mounting portion from which mounting flanges 96a, 96b extend.

As is best seen in FIGS. 9–12, top edge 108 of retainer 16 defines one edge of mounting flanges 96a, 96b while bottom edge 110 defines one side of mounting flanges 98a, 98b. End flange 94 extends upwardly from an intermediate flange 112 which projects outwardly at an inclined angle from the bottom edge 110 of retainer 16. End flange 94 is bent to include a rectilinear rib or ridge 114 facing aperture 100 and defined by an inwardly bent, V-shaped portion 116 at its outer terminal end. Retaining flanges 92a, 92b each extend outwardly at an angle to the longitudinal axis A of retainer 16 (FIG. 9) and are separated from mounting flanges 96a, 96b and 98a, 98b by slots 118 and V-shaped recesses 120, respectively. Each retaining flange 92a, 92b is outwardly curved having a convex outer surface and a concave inner surface and terminating in planar end surfaces 122a, 122b with sharp rectilinear edges 124a, 124b extending between the concave inner surface and the generally planar end surface of each flange. Preferably, ends 122a, 122b and edges 124a, 124b extend at an angle of between about 25° and 30° to longitudinal axis A, most preferably about 27°, such that those ends and edges extend at an angle to one another of between about 50° and 60°, most preferably about 54°. As will be understood from FIGS. 2, 9, and 12–14, retaining flanges 92a, 92b and end flange 94 are spaced from one another and positioned in a generally triangular configuration, each being generally equidistant from aperture 100 and, thus, triangular button support 70 when retainer 16 is mounted in base 14. Retaining flanges 92a, 92b are spaced from one another to define an open release space 125 (FIGS. 2, 11, 13, 14, 16, 20 and 21) which allows release of the windshield mounted button therebetween when those flanges are flexed by an impact force which acts on the breakaway accessory mounting assembly 10 to urge the assembly in a direction such that the button passes through that open release space as will be more fully explained below.

The assembly of retainer 16 with base 14 is now best understood from FIGS. 2, 13 and 15–17. Retainer 16 is generally positioned parallel to retainer receiving surface 52 of body 50 of base 14 with the mounting and retaining flanges extending outwardly away from surface 52. Aperture 100 is aligned with triangular button support 70 and retainer 16 and base 14 are moved together such that aperture 100 telescopes over button support 70. Movement of the two parts together is continued until the outer surfaces of mounting flanges 96a, 96b, 98a, 98b engage the inwardly angled surfaces of wall portions 62a, 62b. Continued movement with pressure forces retainer 16 into the recess defined by wall 62 with mounting flanges 96a, 96b and 98a, 98b being flexed inwardly. As the terminal end surfaces 104a, 104b and 106a, 106b pass the edge of lip 64, the resiliency of the retainer material urges the mounting flanges outwardly such that the terminal ends engage the undersurface of the retaining shoulder defined by lip 64. At the same time, the interference fit between the rounded, upwardly extending lip 102 of aperture 100 and the side surfaces of button support 70 tightly engage one another. Hence, retainer 16 is permanently mounted within the recess defined by wall 62 and against button receiving surface 52 by the combined action of the mounting flanges 96a, 96b and 98a, 98b and lip 64 as well as the interference fit between the edge 102 of aperture 100 and the sides of button support 70. No other fasteners or attachment processes are necessary.

As shown in FIGS. 13 and 15–17, when retainer 16 and base 14 are assembled in this manner, the terminal ends 122a, 122b and 116 of retaining flanges 92a, 92b and end flange 94 project outwardly beyond the terminal surface of wall 62. At the same time, button support surfaces 74, 76a, 76b are positioned slightly below the terminal surface of wall 62 and intermediate retainer receiving surface 52 and the terminal ends of the retaining and end flanges. In addition, intermediate flange 112 from which end flange 94 extends engages and rests on inclined surface 78 to provide support for that end flange and to allow flexing at the bend between flange 94 and intermediate flange 112. In addition, a clearance space is provided between end flange 94 and the interior surface of bottom wall 62c (FIG. 15), while openings 66a, 66b provide clearance space for the outward flexing of retaining flanges 92a, 92b to allow release of the button 12 from assembly 10. In the event base 14 is provided with a wider retainer receiving surface 52 such that larger spaces are provided between retaining flanges 92a, 92b and walls 62a, 62b, openings 66a, 66b may be eliminated so that walls 62a, 62b are continuous and uninterrupted. Further, bottom edge 110 of retainer 16 engages the upper side surfaces of button supports 72a, 72b to help position retainer 16 in base 14 and prevent its shifting. The triangular configuration of button support 70 and aperture 100 are provided to insure proper orientation of bracket 16 on base 14 and to prevent their assembly in any orientation other than that as described above. In addition, the orientation of triangular button support 70 with apex 73 pointing toward release space 125 between retaining flanges 92a, 92b positions the widest portion of the button support surface 74 as close as possible to end flange 94 and support surfaces 76a, 76b. In addition, when assembled in this manner, space 125, which is aligned with apex 73 of button support 70 and end flange 94, is also aligned with the unobstructed open area 55 in base 14 between the upper ends of wall portion 62a, 62b adjacent upper edge 54. As will be understood from FIGS. 13, 14, space 125 of bracket 16 and open area 55 of base 14 define an unobstructed, open passageway which allows button 12 to pass therethrough when a sufficient impact force is received on assembly 10, 150 along axis A through ball member 82 and body 50 (FIG. 9) such that flanges 92a, 92b are flexed toward openings 66a, 66b and button surface 32 slides along button support surfaces 74, 76a and 76b.

As noted above, if base 14 is molded or otherwise formed in one piece, it may include retaining flanges 92a, 92b and end flange 94 molded to be resilient and in one piece with base 14 so as to extend and project outwardly from retainer area 52 without the need for a separately formed and attached retainer 16. The positions and spacing of such flanges with respect to walls 60, 62, button supports 70, 76 and openings 66a, 66b and 56 and the other feature of base 14 would be substantially similar to that when retainer 16 is mounted on base 14 as described above.

Figure 18:
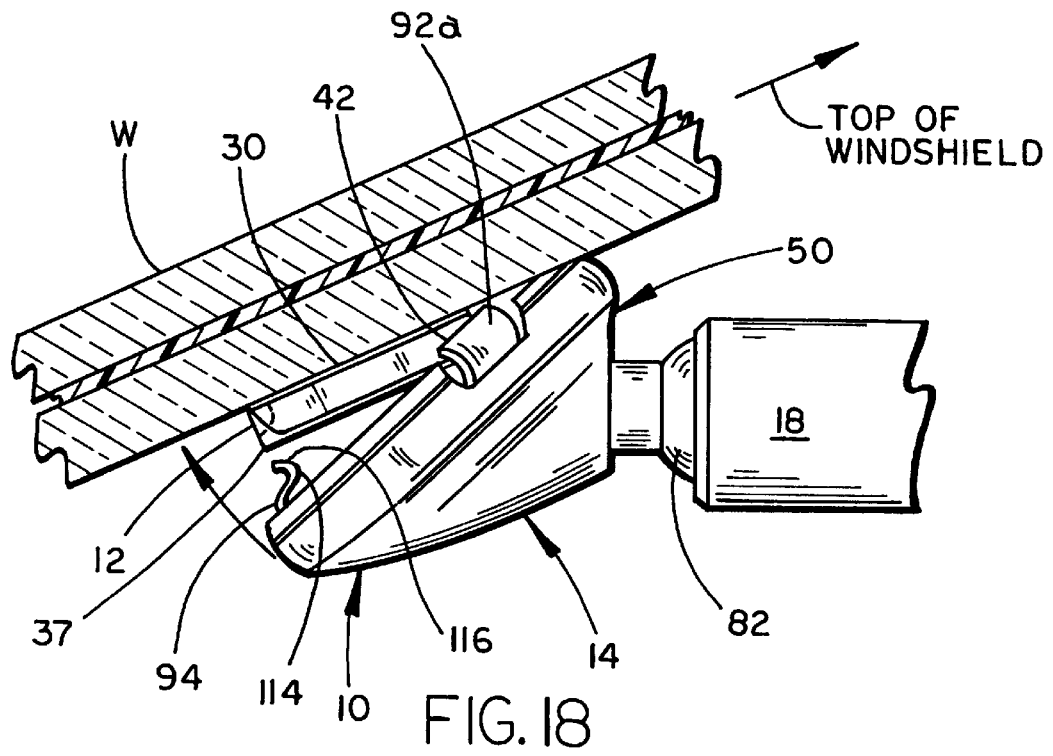
FIG. 18 is a side elevation of the first step in the method for installing the breakaway accessory mounting assembly on a windshield mounted button.
Figure 19:
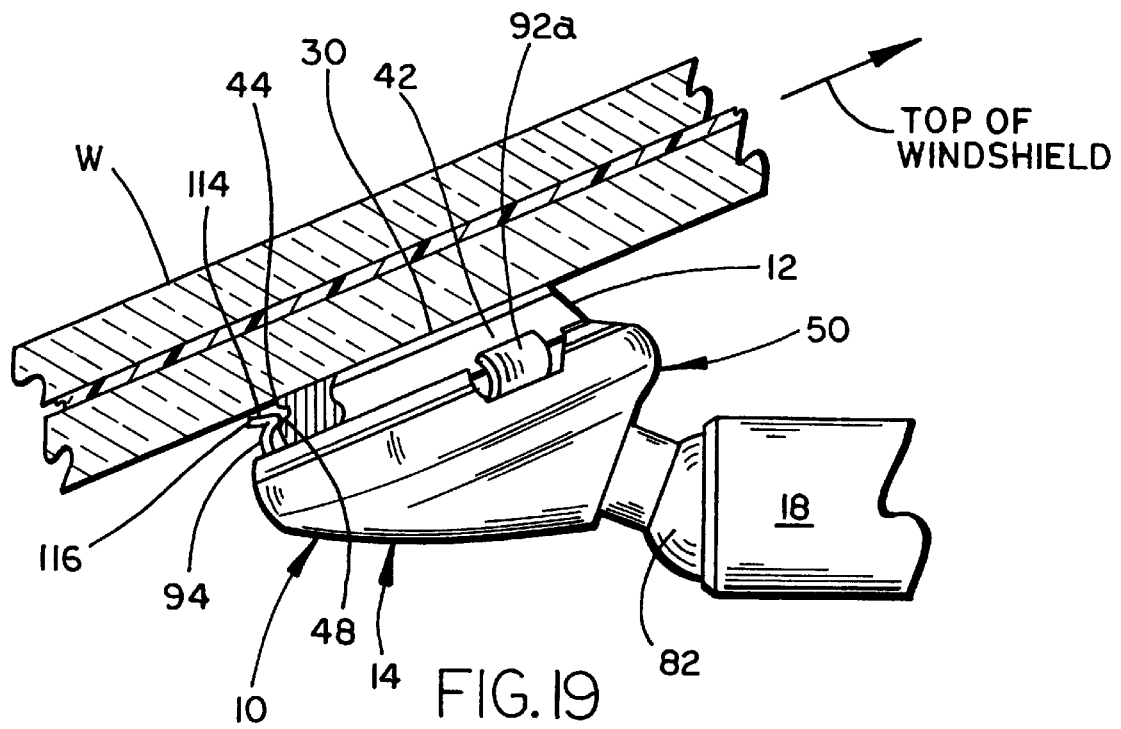
FIG. 19 is a side elevation of the second step in the method for installing the breakaway accessory mounting assembly on the windshield mounted button.
Figure 20:
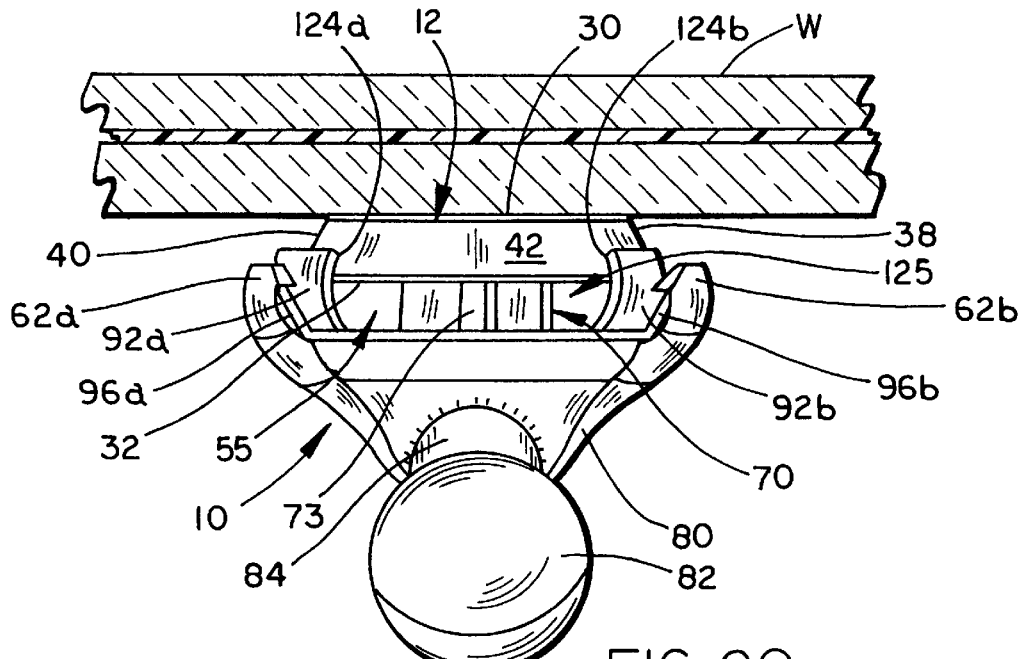
FIG. 20 is an end elevation of the breakaway accessory mounting assembly mounted on the windshield mounted button.

With reference to FIGS. 14–20, the installation and mounting of breakaway accessory mounting assembly 10 on windshield supported button 12 will now be understood. Assembly 10, with accessory support arm 18 mounted on ball member 82 and supporting a rearview mirror 26 or other accessory at the free end thereof, is oriented with ball member 82 extending upwardly toward the top of the windshield and body 50 of base 14 angled outwardly away from the inside surface of windshield W as shown in FIG. 18. Rectilinear edges 124a, 124b of retaining flanges 92a, 92b are hooked over and engaged with generally opposed portions of inwardly angled, curved peripheral edge 42 at the curved top end 34 of button 12 without any sliding action. In such position, terminal end 116 of end flange 94 may be slightly spaced from or touching radiused edge 37 of button 12 extending between surface 32 and end surface 36. The entire assembly is then rotated toward windshield W while retaining flanges 92a, 92b and specifically sharp, rectilinear edges 124a, 124b, remain in contact with peripheral edge portion 42 of button 12 such that the inclined surface of terminal end 116 is forced against edge 37 of button 12 causing flange 94 to flex outwardly at the bend between intermediate flange 112 and end flange 94. The clearance space between end flange 94 and the inner surface of end wall portion 62a allows such flexure while continued rotation forces ridge 114 over rounded edge 37, along the end surface 36 and into recess 44 where ridge 114 engages and rests against the inclined surface of shoulder 48 of recess 44 (FIGS. 15 and 19). In such position, end flange 94 is flexed toward bottom wall portion 62c slightly to create a retaining force generally parallel to surfaces 30, 32 of button 12, button support surfaces 74, 76a, 76b, and the inside surface of windshield W which urges button 12 to the left in FIG. 15, against retaining flanges 92a, 92b, and toward release space 125 between flanges 92a, 92b. Simultaneously, retaining flanges 92a, 92b are slightly flexed outwardly by the engagement of edges 124a, 124b with surface 42 to create opposing retaining forces acting both inwardly toward button support 70 and toward end flange 94 and urging button 12 to the left in FIG. 15. Like the force from end flange 94, the forces from retaining flanges 92a, 92b on button 12 act in a direction generally parallel to surfaces 30, 32 of button 12, button support surfaces 74, 76a, 76b, and the inside surface of windshield W. As a consequence, assembly 10 is generally centered over button support 70 on surface 74 with the lower corner areas of mounting surface 32 of button 12 engaging the support surfaces 76a, 76b of button supports 72a, 72b to provide a stable, three-point support of the button on base 14. Simultaneously, the inwardly angled surfaces 42 and shoulder 48 cause retention of assembly 10 on button 12 and urge assembly 10 toward windshield W since the resiliency of flanges 92a, 92b and end flange 94 thus simultaneously create forces acting generally perpendicular to those inclined surfaces which pull assembly 10 toward button 12. Accordingly, button 12 is generally centered between retaining flanges 92a, 92b and end flange 94 while being held therebetween and urged toward button 12 and windshield W in its mounted position.

When ridge 114 of end flange 94 snaps into recess 44 and against shoulder 48, the installer can feel the snapping action as mounting surface 32 engages against button support surfaces 70, 76a, and 76b. This action provides a tactile feeling and feedback which confirms proper mounting of assembly 10 on button 12 to the installer. In addition, unless flanges 92a, 92b are properly engaged with surface 42 and end flange 94 is properly engaged with ridge 114 in recess 44 and against shoulder 48, the entire assembly, including support arm 18 and mirror 26 or other accessory, will not be retained on the button and will fall away from button 12 when the installer's hand is released from the assembly. The engagement of edges 124a, 124b with surface 42 without the retaining action of end flange 94 in recess 44 will allow the entire assembly to rotate in one direction or the other around the curved surface of button 12 causing the entire assembly to fall from the button unless ridge 114 is properly seated in recess 44. Accordingly, partial engagement, which can lead to severe vibration or dropping of the assembly from the button some time after installation is attempted, is prevented with the present invention. In addition, proper installation provides stable, three-point support of the base 50 against mounting surface 32 of button 12 while the retaining and end flanges tightly hold the assembly to the mounting button. This prevents vibration which would otherwise be transmitted through support arm to the rearview mirror causing reduced quality vision in the mirror while also providing stable support which allows grasping of the mirror or support arm for adjustment purposes without causing shifting of the assembly 10 on the button or otherwise disturbing its properly mounted position.

As will also be understood from FIGS. 13–17 and 20, when the mirror or other supported accessory is impacted by an occupant of the vehicle, an airbag during deployment or another object within the vehicle passenger compartment, assembly 10 will be released from button 12 without fracture or creation of sharp edges due to the flexure of retaining flanges 92a, 92b and end flange 94 regardless of the direction from which the impact force acts on the overall assembly. Importantly, bracket 10 will be released from button 12 when a force acts through the rearwardly facing reflective surface 27 of mirror 26, support arm 18, ball member 82 in the direction of arrow B in FIG. 15 aligned with axis A and open area 55 of base 14, and release space 125 between the retaining flanges 92a, 92b and button support 70 and end flange 94. When an impact force engages the mirror or support arm in such direction, a force is created urging button 12 against retaining flanges 92a, 92b such that the tapered shape of button 12 wedges the retaining flanges apart causing them to flex toward openings 66a, 66b or walls 62a, 62b and allowing the button to slide in a direction generally parallel to support surfaces 74, 76a and 76b and the windshield surface through release space 125 between the retaining flanges. If the impact force is of sufficient size, the button will be forced entirely through and between flanges 92a, 92b in a direction parallel to the plane of the support surfaces and on through the unobstructed open area in base 14 and the passageway defined by space 125 and open area 55, between the ends of wall portions 62a, 62b and away from end flange 94 such that the entire assembly 10 will move downwardly off button 12 toward the instrument panel and/or floor of the vehicle out of harms way.

Likewise, should assembly 10 be struck from under ball member 82 in the direction of arrow C in FIG. 15, end flange 94 will be flexed outwardly in the reverse of the installation procedure also allowing the assembly to fall from the button after ridge 114 moves out of recess 44. Further, impact from the sides of the mirror and support arm on assembly 10 and toward one of the inclined wall surfaces 65 will cause flexure of one or the other of retaining flanges 92a, 92b and/or end flange 94, allowing one of the rounded corners 35 to engage one of the inclined wall surfaces 65 such that the base 14 and thus assembly 10 will be cammed away from button 12 and windshield W, again allowing release of the assembly from the button 12. The same occurs if impact forces are directed at oblique angles to the side or end surfaces of the assembly since one or more of the retaining and/or end flanges will flex and segments of corners 35 and inclined wall surfaces 65 will engaged one another to allow release of the assembly in reaction to such forces. Accordingly, release of the assembly when impacted by forces acting in virtually any direction on the mirror or support arm when supported by assembly 10 on button 12 is provided for with the present invention.

Figure 21:
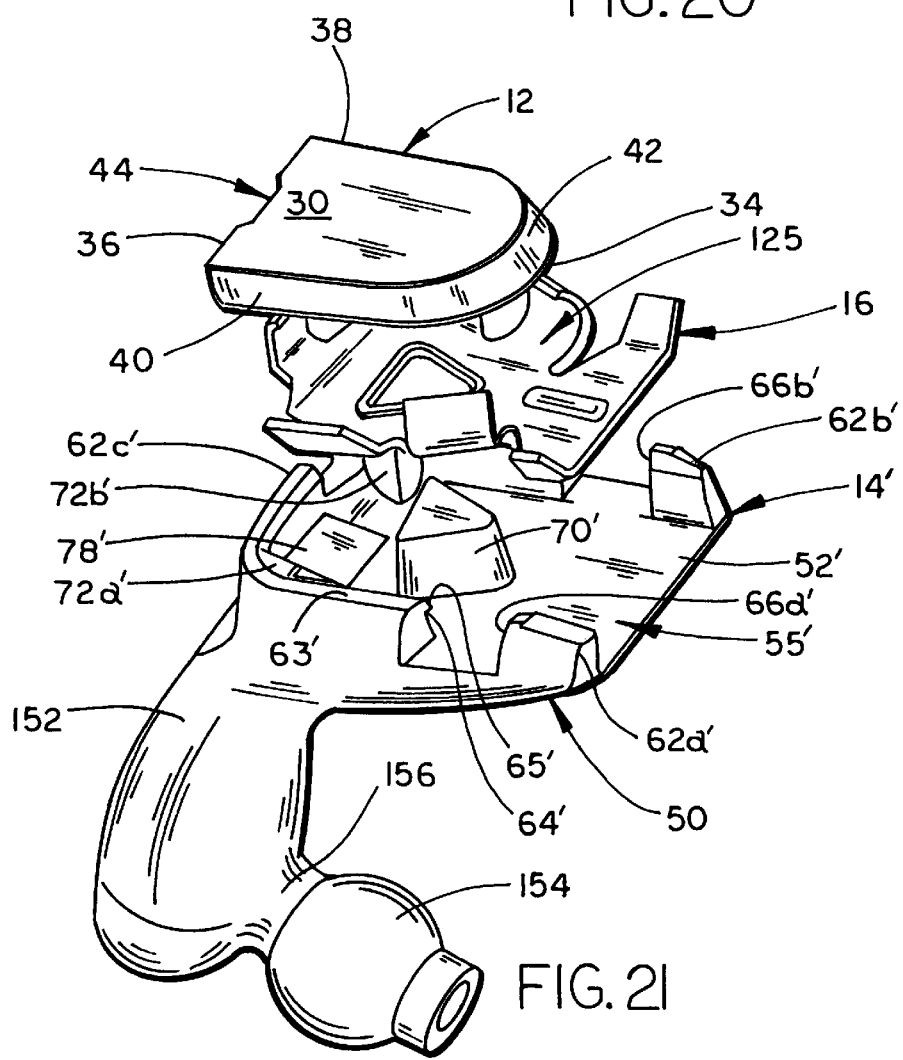
FIG. 21 is a perspective view of a second embodiment of the breakaway accessory mounting assembly of the present invention formed on a support arm for an interior mirror assembly including a single adjustment ball member.

As shown in FIG. 21, a second embodiment 150 of the breakaway accessory mounting assembly of the present invention is shown where like numerals indicate like parts to those in embodiment 10. Assembly 150 incorporates retainer 16 adapted for engagement with windshield supported button 12 in the same manner as described above for embodiment 10. Retainer 16 is adapted to be mounted on a base 14', including a retainer receiving surface 52', and upstanding wall 62' defining a recess receiving retainer 16 in the same manner as in embodiment 10, along with button supports 70', 72a', 72b', inclined surface 78', a retaining shoulder defined by lip 64', inclined wall surfaces 65', flexure openings 66a' 66b', and the remaining features of body 50 of embodiment 10. In addition, however, base 14' includes a downwardly extending, rigid support arm 152 including a rearwardly extending projection defining a ball member 154 on neck 156. Ball member 154 is adapted to be received in a swivel socket formed in a rearview mirror assembly or other accessory to be mounted via assembly 150 adjacent the inner surface of a windshield in like manner to that described above for embodiment 10. Ball member 154 provides a single swivel joint for adjusting the position of the mirror or other accessory as opposed to the double swivel joint provided by double ball support arm 18 in embodiment 10. Alternately, ball member 154 in embodiment 50 could be a swivel socket at the end of arm 152 in the manner described in U.S. patent application Ser. No. 08/336,296, filed Nov. 8, 1994, assigned to the same assignee as the present invention, now U.S. Pat. No. 5,615,857, the disclosure of which is hereby incorporated by reference herein. Accordingly, the present invention is useful with both single ball adjustment systems and double ball adjustment systems.

While several forms of the inventions have been shown and described, other forms will now be apparent to those skilled in the art. Therefore, it will be understood that the embodiments shown in the drawings and described above are merely for illustrative purposes, and are not intended to limit the scope of the invention which is defined by the claims which follow interpreted under the principles of the patent law including the Doctrine of Equivalents.

The embodiments of the invention in which an exclusive property or privilege is claimed are as follows:

1. A windshield supported, vehicular rearview mirror mounting assembly adapted for breakaway release when the rearview mirror is impacted in a collision by a vehicle occupant and/or by a deploying airbag, said assembly comprising:

a base having a body for connecting said assembly to a windshield mounted button, a button support on said body, an unobstructed open area on one portion of said body and an accessory/support mount providing a connection for said base to at least one of a rearview mirror and a support for a rearview mirror; and a plurality of resilient retaining flanges on said base to releasably secure said mounting assembly to the windshield mounted button such that the button engages said button support, said retaining flanges being formed from resilient material and located at positions spaced from one another around said button support for engaging the windshield mounted button to generally center the button therebetween and releasably hold the button therebetween and against said button support yet resiliently flex to release the button when the rearview mirror or accessory is impacted;

a pair of said resilient flanges defining an open release space therebetween allowing release of said button therebetween when said pair of resilient flanges are flexed by an impact force which acts on said assembly to urge said assembly in a direction such that the button is moved through said open release space, said assembly providing an open, unobstructed passageway between said open release space and said unobstructed open area allowing release of the button from said assembly through said open area when said button is caused to move between said pair of resilient flanges.

2. The mounting assembly of claim 1 including three of said resilient retaining flanges which are spaced in a triangular configuration around said button support; said pair of resilient flanges comprising two of said three resilient flanges which define said open release space; the third of said resilient flanges being aligned in opposition to said open release space, said unobstructed passageway and said unobstructed open area.

3. The mounting assembly of claim 2 wherein a pair of said resilient, retaining flanges are spaced from one another and said button support on opposite sides of said button support and have button engaging surfaces extending at an acute angle to one another and adapted to engage generally opposed portions of the button, said third resilient flange comprising an end flange spaced from said pair of retaining flanges and said button support and adapted to engage a recess in an end surface of the button in opposition to the generally opposed portions engaged by said pair of retaining flanges, said pair of resilient retaining flanges and said end flange being positioned in a triangular configuration around said button support to exert generally opposed forces which generally center and hold the button therebetween and against said button support yet resiliently flex to release the button when the rearview mirror or accessory is impacted.

4. The mounting assembly of claim 3 wherein said end flange, said button support, said open release space and said unobstructed open area of said base are aligned along a common axis; said accessory/support mount being in alignment with said axis.

5. The mounting assembly of claim 4 wherein said accessory/support mount includes a ball member extending outwardly from said body.

6. The mounting assembly of claim 5 wherein said button support on said base includes a button support surface lying in a plane; said resilient retaining and end flanges exerting said opposed forces generally parallel to said plane; said ball member extending outwardly at an acute angle to said plane.

7. The mounting assembly of claim 1 wherein the windshield mounted button adapted for use with said mounting assembly includes an attachment surface for attachment to a windshield surface, a mounting surface for engaging said assembly, and a peripheral edge extending between said attachment and mounting surfaces, the peripheral edge defining a top end, bottom end and opposing sides, the sides converging toward one another in the direction of said top end and tapering inwardly toward one another from the mounting surface to the attachment surface, the peripheral edge at the top end being curved and inclined inwardly from the mounting surface to the attaching surface, the bottom end including a bottom recess spaced toward said attachment surface from the mounting surface and having an inner surface and a recess shoulder extending between the inner surface and the bottom end;

said end flange including a terminal end portion adapted to project into the bottom recess and engage the recess shoulder of the button to resist movement of said assembly away from the button.

8. The mounting assembly of claim 7 wherein said retaining flanges engage the curved top end of the button peripheral edge to resist movement of said assembly away from the button when said assembly is mounted on the button.

9. The mounting assembly of claim 8 wherein said button support has a support surface adapted to engage the mounting surface of the button; said retaining flanges projecting outwardly from said base, each retaining flange having a terminal end, said terminal ends adapted to contact opposed portions of the top end of the button to urge the button in a direction generally parallel to said support surface of said button support and toward said end flange while resisting movement of said assembly away from the button, said end flange projecting outwardly from said base to engage the button recess and recess shoulder to urge the button generally in a direction toward said release space between said retaining flanges while resisting movement of said assembly away from the button.

10. The mounting assembly of claim 9 wherein said body includes second and third button supports spaced from said button support and positioned adjacent said end flange and providing a three-point support on the mounting surface of the button when said assembly is mounted on the button.

11. The mounting assembly of claim 10 wherein said body includes a retainer receiving portion which is adapted to receive and mount a retainer for connecting said assembly to the button; said retainer receiving portion defining a retainer recess in said body and including an upstanding wall extending partially therearound and terminating at said open area, said wall including a shoulder; said assembly also including a one-piece retainer formed from resilient material and including a retainer mounting portion for mounting said retainer on said retainer receiving portion of said base and said plurality of resilient retaining flanges, said retainer mounting portion also including a plurality of resilient, upstanding mounting flanges, each mounting flange having a terminal end, said terminal ends of said mounting flanges engaging said shoulder on said wall and securing said retainer in said retainer recess.

12. The mounting assembly of claim 11 wherein said retainer mounting portion further includes an aperture receiving said button support with an interference fit to help secure said retainer on said retainer receiving portion.

13. The mounting assembly of claim 9 wherein said body includes a retainer receiving portion which is adapted to receive and mount a retainer for connecting said assembly to the button; said assembly also including a one-piece retainer formed from resilient material and including a retainer mounting portion for mounting said retainer on said retainer receiving portion of said base and said plurality of resilient retaining flanges, each of said retaining flanges being arcuate, extending outwardly from said retainer mounting portion, having a concave side facing said button support, and having a sharp, rectilinear edge between said concave side and said terminal end, said sharp edge adapted to tangentially engage the curved top end of the button when said assembly is mounted on the button.

14. The mounting assembly of claim 13 wherein said rectilinear sharp edges of said retaining flanges extend at an angle to one another within the range of between about 50° and 60°.

15. The mounting assembly of claim 14 wherein said button support surface is triangular in shape and has one side facing said end flange, a second side facing one of said retaining flanges, and a third side facing the other of said retaining flanges, said second and third sides defining an apex pointing toward said release space between said retaining flanges.

16. The mounting assembly of claim 1 wherein said body includes a retainer receiving portion which is adapted to receive and mount a retainer for connecting said assembly to the button; said assembly also including a one-piece retainer formed from resilient material including a retainer mounting portion for mounting said retainer on said retainer receiving portion of said base and said plurality of resilient retaining flanges, said retainer receiving portion including an upstanding wall having a terminal surface and extending partially therearound and ending at said open area, said wall including a shoulder; said retainer mounting portion also including a plurality of resilient, upstanding mounting flanges, each mounting flange having a terminal end, said terminal ends of said mounting flanges engaging said shoulder on said wall and securing said retainer on said retainer receiving portion.

17. The mounting assembly of claim 16 wherein said retainer mounting portion further includes an aperture receiving said button support with an interference fit to help secure said retainer on said retainer receiving portion.

18. The mounting assembly of claim 16 wherein said upstanding wall has an opening adjacent said end flange for receiving a tool to remove said assembly from the button.

19. The mounting assembly of claim 16 wherein said retainer receiving portion is generally rectangular in shape and has four corner areas; said retainer including four of said resilient, upstanding mounting flanges, one mounting flange positioned generally adjacent each of said corner areas respectively.

20. The mounting assembly of claim 16 wherein said upstanding wall includes an inclined surface extending from adjacent said shoulder to said wall terminal surface, said inclined wall surface being adapted to engage the button to cam said assembly away from the button when the rearview mirror or accessory is impacted in a direction toward said inclined surface.

21. The mounting assembly of claim 1 wherein said base includes an upstanding wall extending at least partially around said plurality of resilient flanges and said button support, said wall including a pair of inclined surfaces spaced opposite one another and inclined toward one another and away from said base, said inclined surfaces adapted to engage the button to cam said assembly away from the button when the rearview mirror or accessory is impacted in a direction toward one of said inclined surfaces.

22. The mounting assembly of claim 1 wherein said body includes a retainer receiving portion which is adapted to receive and mount a retainer for connecting said assembly to the button; said assembly also including a one-piece retainer formed from resilient material and including a retainer mounted portion for mounting said retainer on said retainer receiving portion of said base and said plurality of resilient retaining flanges.

23. A windshield supported vehicular rearview mirror mounting assembly adapted for breakaway release when the rearview mirror is impacted in a collision by a vehicle occupant and/or by a deploying airbag, said assembly comprising:

a base having a body for connecting said assembly to a windshield mounted button, a button support on said body, an unobstructed open area on one portion of said body, and an accessory/support mount providing a connection for said base to at least one of a rearview mirror and a support for a rearview mirror; and a plurality of resilient retaining flanges on said base to releasably secure said mounting assembly to the windshield mounted button such that the button engages said button support, said retaining flanges being formed from resilient material and located at positions spaced from one another around said button support for engaging the windshield mounted button to generally center the button therebetween and releasably hold the button therebetween and against said button support vet resiliently flex to release the button when the rearview mirror or accessory is impacted;

a pair of said resilient flanges defining an open release space therebetween allowing release of said button therebetween when said pair of resilient flanges are flexed by an impact force which acts on said assembly to urge said assembly in a direction such that the button is moved through said open release space, said assembly providing an open, unobstructed passageway between said open release space and said unobstructed open area allowing release of the button from said assembly through said open area when said button is caused to move between said pair of resilient flanges;

the windshield mounted button adapted for use with said mounting assembly including an attachment surface for attachment to a windshield surface, a mounting surface for engaging said assembly, and a peripheral edge extending between said attachment and mounting surfaces, the peripheral edge defining a top end, bottom end and opposing sides, the sides converging toward one another in the direction of said top end and tapering inwardly toward one another from the mounting surface to the attachment surface, the peripheral edge at the top end being curved and inclined inwardly from the mounting surface to the attaching surface, the bottom end including a bottom recess spaced toward said attachment surface from the mounting surface and having an inner surface and a recess shoulder extending between the inner surface and the bottom end;

said end flange including a terminal end portion adapted to project into the bottom recess and engage the recess shoulder of the button to resist movement of said assembly away from the button;

said retaining flanges engaging the curved top end of the button peripheral edge to resist movement of said assembly away from the button when said assembly is mounted on the button;

said button support having a support surface adapted to engage the mounting surface of the button; said retaining flanges projecting outwardly from said base, each retaining flange having a terminal end, said terminal ends adapted to contact opposed portions of the top end of the button to urge the button in a direction generally parallel to said support surface of said button support and toward said end flange while resisting movement of said assembly away from the button, said end flange projecting outwardly from said base to engage the button recess and recess shoulder to urge the button generally in a direction toward said release space between said retaining flanges while resisting movement of said assembly away from the button;

said body including second and third button supports spaced from said button support and positioned adjacent said end flange and providing a three-point support on the mounting surface of the button when said assembly is mounted on the button, and a retainer receiving portion which is adapted to receive and mount a retainer for connecting said assembly to the button; said retainer receiving portion defining a retainer recess in said body and including an upstanding wall extending partially therearound and terminating at said open area, said wall including a shoulder and a terminal edge; said assembly also including a one-piece retainer formed from resilient material and including a retainer mounting portion for mounting said retainer on said retainer receiving portion of said base and said plurality of resilient retaining flanges, said retainer mounting portion also including a plurality of resilient, upstanding mounting flanges, each mounting flange having a terminal end, said terminal ends of said mounting flanges engaging said shoulder on said wall and securing said retainer in said retainer recess;

said retaining and end flanges extending beyond said terminal edge of said wall.

24. The mounting assembly of claim 23 wherein said retainer recess includes a floor surface; each of said second and third button supports including a button support surface adapted to engage the mounting surface of the button, said button support surfaces being co-planar with one another and spaced from said retainer recess floor surface and positioned intermediate said floor surface and said terminal ends and end portion of said retaining and end flanges.

25. A windshield supported, vehicular rearview mirror mounting assembly adapted for breakaway release when the rearview mirror is impacted in a collision by a vehicle occupant and/or by a deploying airbag, said assembly comprising:

a base having a body for connecting said assembly to a windshield mounted button, a button support on said body, an unobstructed open area on one portion of said body, and an accessory/support mount providing a connection for said base to at least one of a rearview mirror and a support for a rearview mirror; and a plurality of resilient retaining flanges on said base to releasably secure said mounting assembly to the windshield mounted button such that the button engages said button support, said retaining flanges being formed from resilient material and located at positions spaced from one another around said button support for engaging the windshield mounted button to generally center the button therebetween and releasably hold the button therebetween and against said button support vet resiliently flex to release the button when the rearview mirror or accessory is impacted;

a pair of said resilient flanges defining an open release space therebetween allowing release of said button therebetween when said pair of resilient flanges are flexed by an impact force which acts on said assembly to urge said assembly in a direction such that the button is moved through said open release space, said assembly providing an open, unobstructed passageway between said open release space and said unobstructed open area allowing release of the button from said assembly through said open area when said button is caused to move between said pair of resilient flanges;

the windshield mounted button adapted for use with said mounting assembly including an attachment surface for attachment to a windshield surface, a mounting surface for engaging said assembly, and a peripheral edge extending between said attachment and mounting surfaces, the peripheral edge defining a top end, bottom end and opposing sides, the sides converging toward one another in the direction of said top end and tapering inwardly toward one another from the mounting surface to the attachment surface, the peripheral edge at the top end being curved and inclined inwardly from the mounting surface to the attaching surface, the bottom end including a bottom recess spaced toward said attachment surface from the mounting surface and having an inner surface and a recess shoulder extending between the inner surface and the bottom end;

said end flange including a terminal end portion adapted to project into the bottom recess and engage the recess shoulder of the button to resist movement of said assembly away from the button;

said retaining flanges engaging the curved top end of the button peripheral edge to resist movement of said assembly away from the button when said assembly is mounted on the button;

said button support having a support surface adapted to engage the mounting surface of the button; said retaining flanges projecting outwardly from said base, each retaining flange having a terminal end, said terminal ends adapted to contact opposed portions of the top end of the button to urge the button in a direction generally parallel to said support surface of said button support and toward said end flange while resisting movement of said assembly away from the button, said end flange projecting outwardly from said base to engage the button recess and recess shoulder to urge the button generally in a direction toward said release space between said retaining flanges while resisting movement of said assembly away from the button;

said body including second and third button supports spaced from said button support and positioned adjacent said end flange and providing a three-point support on the mounting surface of the button when said assembly is mounted on the button, and a retainer receiving portion which is adapted to receive and mount a retainer for connecting said assembly to the button; said retainer receiving portion defining a retainer recess in said body and including an upstanding wall extending partially therearound and terminating at said open area, said wall including a shoulder and a terminal edge; said assembly also including a one-piece retainer formed from resilient material and including a retainer mounting portion for mounting said retainer on said retainer receiving portion of said base and said plurality of resilient retaining flanges, said retainer mounting portion also including a plurality of resilient, upstanding mounting flanges, each mounting flange having a terminal end, said terminal ends of said mounting flanges engaging said shoulder on said wall and securing said retainer in said retainer recess;

said wall including an opening therein adjacent each of said retaining flanges providing clearance to allow flexing of said retaining flanges for release of said assembly from the button upon impact.

26. A windshield supported, vehicular rearview mirror mounting assembly adapted for breakaway release when the rearview mirror is impacted in a collision by a vehicle occupant and/or by a deploying airbag, said assembly comprising:

a base having a body for connecting said assembly to a windshield mounted button, a button support on said body, an unobstructed open area on one portion of said body, and an accessory/support mount providing a connection for said base to at least one of a rearview mirror and a support for a rearview mirror; and a plurality of resilient retaining flanges on said base to releasably secure said mounting assembly to the windshield mounted button such that the button engages said button support, said retaining flanges being formed from resilient material and located at positions spaced from one another around said button support for engaging the windshield mounted button to generally center the button therebetween and releasably hold the button therebetween and against said button support yet resiliently flex to release the button when the rearview mirror or accessory is impacted;

a pair of said resilient flanges defining an open release space therebetween allowing release of said button therebetween when said pair of resilient flanges are flexed by an impact force which acts on said assembly to urge said assembly in a direction such that the button is moved through said open release space, said assembly providing an open, unobstructed passageway between said open release space and said unobstructed open area allowing release of the button from said assembly through said open area when said button is caused to move between said pair of resilient flanges;

said body including a retainer receiving portion which is adapted to receive and mount a retainer for connecting said assembly to the button; said assembly also including a one-piece retainer formed from resilient material including a retainer mounting portion for mounting said retainer on said retainer receiving portion of said base and said plurality of resilient retaining flanges, said retainer receiving portion including an upstanding wall having a terminal surface and extending partially therearound and ending at said open area, said wall including a shoulder; said retainer mounting portion also including a plurality of resilient, upstanding mounting flanges, each mounting flange having a terminal end, said terminal ends of said mounting flanges engaging said shoulder on said wall and securing said retainer on said retainer receiving portion;

said wall including an opening therein adjacent each of said retaining flanges providing clearance to allow flexing of said retaining flanges for release of said assembly from the button upon impact.

27. A windshield supported, vehicular rearview mirror mounting assembly adapted for breakaway release when the rearview mirror is impacted in a collision by a vehicle occupant and/or by a deploying airbag, said assembly comprising:

a base having a body, a bracket receiving portion which receives and mounts a bracket for connecting said assembly to a windshield mounted button, a button support on said bracket receiving portion, an unobstructed open area on one portion of said body, and an accessory/support mount providing a connection for said base to at least one of a rearview mirror and a support for a rearview mirror; and a bracket formed from resilient material and having a mounting portion mounting said bracket on said bracket receiving portion of said body to releasably secure said mounting assembly to the windshield mounted button such that the button engages said button support, said bracket also including a plurality of resilient retaining flanges located at positions spaced from one another around said button support for engaging the windshield mounted button to generally center the button therebetween and releasably hold the button therebetween and against said button support yet resiliently flex to release the button when the rearview mirror or accessory is impacted;

said bracket including an open release space between a pair of said resilient flanges allowing release of said button therebetween when said pair of resilient flanges are flexed by an impact force which acts on said assembly to urge said assembly in a direction such that the button is moved through said open release space; said base including an unobstructed open area aligned with said release space; said bracket and base together including an open, unobstructed passageway between said open release space and said unobstructed open area allowing release of the button from said assembly through said open area when said button is caused to move between said pair of resilient flanges.

28. A windshield supported, vehicular rearview mirror mounting assembly adapted for breakaway release when the rearview mirror is impacted in a collision by a vehicle occupant and/or by a deploying airbag, said assembly adapted for use with a button adapted for attachment to the surface of a windshield in the vehicle, the button including an attachment surface for attachment to a windshield surface, a mounting surface for engaging said assembly, and a peripheral edge extending between the attachment and mounting surfaces, the peripheral edge defining a top end, bottom end and opposing sides, the sides converging toward one another in the direction of said top end and tapering inwardly toward one another from the mounting surface to the attachment surface, the peripheral edge at the top end being curved and inclined inwardly from the mounting surface to the attaching surface, the bottom end including a bottom recess spaced toward said attachment surface from the mounting surface and having an inner surface and a recess shoulder extending between the inner surface and the bottom end; said assembly comprising:

a base having a body, a retainer receiving portion which is adapted to receive and mount a retainer for connecting said assembly to a windshield mounted button, a button support on said retainer receiving portion, an unobstructed open area on one portion of said body, and an accessory/support mount providing a connection for said base to at least one of a rearview mirror and a support for a rearview mirror; and a retainer formed from resilient material and having a mounting portion mounting said retainer on said retainer receiving portion of said body to releasably secure said mounting assembly to the windshield mounted button such that the button engages said button support, said retainer also including a plurality of resilient retaining flanges positioned in a triangular configuration around said button support for engaging the top end and the recess shoulder of the button to generally center the button therebetween and releasably hold the button therebetween and against said button support yet resiliently flex to release the button when the rearview mirror or accessory is impacted;

said retainer including an open release space between a pair of said resilient flanges allowing release of said button therebetween when said pair of resilient flanges are flexed by an impact force which acts on said assembly to urge said assembly in a direction such that the button is moved through said open release space; said base including an unobstructed open area aligned with said release space; said retainer and base together including an open, unobstructed passageway between said open release space and said unobstructed open area allowing release of the button from said assembly through said open area when said button is caused to move between said pair of resilient flanges.

29. The mounting assembly of claim 28 wherein said button support includes a button support surface lying in a plane; said resilient retaining flanges adapted to exert forces on the button generally parallel to said plane.

30. The mounting assembly of claim 29 wherein said pair of said retaining flanges are spaced from one another and said button support on opposite sides of said button support and have button engaging surfaces extending at an acute angle to one another said plurality of resilient retaining flanges also including a third retaining flange comprising an end flange spaced from said pair of retaining flanges and said button support, said pair of retaining flanges adapted to engage generally opposed portions of the curved top end of the button while said end flange is adapted to engage the recess shoulder of the bottom recess of the button to resist movement of said assembly away from the button.

31. The mounting assembly of claim 30 wherein said body includes second and third button supports spaced from said button support and positioned adjacent said end flange and providing a three-point support on the mounting surface of the button when said assembly is mounted on the button.

32. The mounting assembly of claim 31 wherein said retainer receiving portion is a retainer recess in said body and includes an upstanding wall extending partially therearound and terminating at said open area, said wall including a shoulder; said retainer mounting portion including a plurality of resilient, upstanding mounting flanges, each mounting flange having a terminal end, said terminal ends of said mounting flanges engaging said shoulder on said wall and securing said retainer in said retainer recess.

33. The mounting assembly of claim 32 wherein said retainer mounting portion includes an aperture receiving said button support with an interference fit to help secure said retainer on said retainer receiving portion.

34. The mounting assembly of claim 32 wherein said wall includes an opening therein adjacent each of said retaining flanges providing clearance to allow flexing of said retaining flanges for release of said assembly from the button upon impact.

35. The mounting assembly of claim 31 wherein said retainer recess includes a floor surface; each of said second and third button supports including a button support surface adapted to engage the mounting surface of the button, said button support surfaces being co-planar with one another and spaced from said retainer recess floor surface and positioned intermediate said floor surface and said terminal ends and end portion of said retaining and end flanges.

36. The mounting assembly of claim 30 wherein said retaining flanges extend at an angle to one another within the range of between about 50° and 60°.

37. The mounting assembly of claim 30 wherein said button support surface is triangular in shape and has one side facing said end flange, a second side facing one of said retaining flanges, and a third side facing the other of said retaining flanges, said second and third sides defining an apex pointing toward said release space between said retaining flanges.

38. The mounting assembly of claim 28 wherein said retainer receiving portion includes an upstanding wall extending partially therearound and terminating at said open area, said wall including a shoulder; said retainer mounting portion including a plurality of resilient, upstanding mounting flanges, each mounting flange having a terminal end, said terminal ends of said mounting flanges engaging said shoulder on said wall and securing said retainer on said retainer receiving portion.

39. The mounting assembly of claim 38 wherein said retainer mounting portion includes an aperture receiving said button support with an interference fit to help secure said retainer on said retainer receiving portion.

40. The mounting assembly of claim 39 wherein said retainer receiving portion is generally rectangular in shape and has four corner areas; said retainer including four of said resilient, upstanding mounting flanges, one mounting flange positioned generally adjacent each of said corner areas respectively.

41. The mounting assembly of claim 38 wherein said upstanding wall includes an inclined surface extending from adjacent said shoulder to said wall terminal surface, said inclined wall surface being adapted to engage the button to cam said assembly away from the button when the rearview mirror or accessory is impacted in a direction toward said inclined surface.

42. The mounting assembly of claim 28 wherein said retainer receiving portion includes an upstanding wall extending at least partially around said plurality of resilient flanges and said button support, said wall including a pair of inclined surfaces spaced opposite one another and inclined toward one another and away from said base, said inclined surfaces adapted to engage the button to cam said assembly away from the button when the rearview mirror or accessory is impacted in a direction toward one of said inclined surfaces.

43. A windshield-supported, vehicular rearview mirror mounting assembly adapted for breakaway release when the rearview mirror is impacted in a collision by a vehicle occupant and/or by a deploying airbag, said assembly comprising:

a base having a body, an upstanding wall defining a recess on said body, a button support in said recess and an accessory/support mount providing a connection for said base to at least one of a rearview mirror and a support for a rearview mirror; and a one-piece retainer formed from resilient material and having a plurality of spaced, resilient, upstanding flanges adapted to releasably engage a windshield mounted button and retain said assembly on the button yet resiliently flex to release the button when the rearview mirror or accessory is impacted, and a plurality of spaced, resilient, mounting flanges which secure said retainer in said recess, and an aperture having a periphery configured to the shape of and receiving said button support;

said wall on said body including a shoulder, said mounting flanges engaging said shoulder while said aperture periphery engages said button support with an interference fit, whereby said retainer is secured in said recess without separate fasteners.

44. The mounting assembly of claim 43 wherein each mounting flange has a terminal end, said terminal ends of said mounting flanges engaging said shoulder on said wall and securing said retainer in said recess.

45. The mounting assembly of claim 43 wherein said button support includes a first support surface, said body including second and third button supports in said recess and spaced from said button support; said recess including a floor surface; said resilient, upstanding flanges having terminal ends spaced from said recess floor surface; each of said second and third button supports including a button support surface which is co-planar with said button support surface of said button support, said button support surfaces being spaced from said recess floor surface and positioned intermediate said floor surface and said terminal ends of said retaining flanges.

46. The mounting assembly of claim 43 wherein said retainer receiving portion is generally rectangular in shape and has four corner areas; said retainer including four of said resilient, upstanding mounting flanges, one mounting flange positioned generally adjacent each of said corner areas respectively.

47. An accessory mounting button for attachment to a vehicle surface for supporting a rearview mirror for use by an occupant of the vehicle, said button comprising:

an attachment surface for attachment to a vehicle support surface;

a mounting surface for engaging a rearview mirror mounting assembly;

a peripheral edge extending between said attachment and mounting surfaces, said peripheral edge defining a top end, bottom end and opposing sides, said sides converging toward one another in the direction of said top end, and tapering inwardly toward one another from said mounting surface to said attachment surface; said peripheral edge being curved, said top end inclined inwardly from said mounting surface to said attachment surface; said bottom end including a recess spaced toward said attachment surface from said mounting surface.

48. The accessory mounting button of claim 47 wherein said recess includes an inner surface and a shoulder extending from said inner surface to said bottom end.

49. The accessory mounting button of claim 48 wherein said shoulder is inclined toward said mounting surface from said inner surface.

50. The accessory button of claim 47 including a corner extending between said attachment surface and said bottom end.

51. The accessory mounting button of claim 47 wherein said recess opens to said attachment surface.

\* \* \* \* \*

UNITED STATES PATENT AND TRADEMARK OFFICE
CERTIFICATE OF CORRECTION

PATENT NO. : 5,820,097
DATED : October 13, 1998
INVENTOR(S) : Ralph A. Spooner

It is certified that error appears in the above-identified patent and that said Letters Patent is hereby corrected as shown below:

Column 5, line 31:
    After "15" insert --is--

Column 16, line 52:
    "vet" should be --yet--

Column 18, line 20:
    "vet" should be --yet--

Column 19, line 51:
    "vet" should be --yet--

Signed and Sealed this

Third Day of August, 1999

Q. TODD DICKINSON

*Attest:*

*Attesting Officer*      Acting Commissioner of Patents and Trademarks